US012679312B2

(12) United States Patent
Kapocs et al.

(10) Patent No.: US 12,679,312 B2
(45) Date of Patent: Jul. 14, 2026

(54) BRAKE PEDAL WITH SAFETY FEATURES

(71) Applicant: Volvo Car Corporation, Gothenburg (SE)

(72) Inventors: Marcel Kapocs, Gothenburg (SE); Mickael Larsen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/978,251

(22) Filed: Dec. 12, 2024

(65) Prior Publication Data

US 2025/0206269 A1     Jun. 26, 2025

(30) Foreign Application Priority Data

Dec. 20, 2023     (EP) ..................................... 23218668

(51) Int. Cl.
B60T 7/06     (2006.01)
G05G 1/30     (2008.04)
G05G 1/32     (2008.04)
G05G 1/44     (2008.04)

(52) U.S. Cl.
CPC ................ B60T 7/065 (2013.01); G05G 1/32 (2013.01); G05G 1/44 (2013.01)

(58) Field of Classification Search
CPC ... B60T 7/04; B60T 7/06; B60T 7/065; B60T 13/74; G05G 1/32; G05G 1/323; G05G 1/327; G05G 1/44
See application file for complete search history.

(56) References Cited

U.S. PATENT DOCUMENTS

| | | | | |
|---|---|---|---|---|
| 5,934,151 A * | 8/1999 | Carr | .......................... | G05G 1/30 |
| | | | | 403/12 |
| 7,441,478 B2 * | 10/2008 | Burgstaler | .............. | B60T 11/18 |
| | | | | 248/200 |
| 7,987,743 B2 * | 8/2011 | Sukonthapanich | ..... | B60T 7/065 |
| | | | | 74/512 |
| 8,381,862 B2 * | 2/2013 | Hjerpe | ..................... | G05G 1/32 |
| | | | | 180/274 |
| 10,133,294 B2 * | 11/2018 | Kawahara | ............... | F16C 35/02 |
| 10,768,656 B1 * | 9/2020 | Kapocs | .................. | B60T 11/18 |
| 10,960,858 B2 * | 3/2021 | Jarjoura | ................ | B60R 21/09 |
| 11,994,894 B2 * | 5/2024 | Jarjoura | ................ | B60R 21/09 |

(Continued)

FOREIGN PATENT DOCUMENTS

| | | | | | |
|---|---|---|---|---|---|
| CN | 110901607 A | * | 3/2020 | .............. | B60T 7/065 |
| CN | 111845665 A | * | 10/2020 | ............... | B60T 7/06 |
| CN | 113060105 A | | 7/2021 | | |

(Continued)

OTHER PUBLICATIONS

European Search Report issued in corresponding EP Application No. 23218668.

*Primary Examiner* — Adam D Rogers
(74) *Attorney, Agent, or Firm* — Clements Bernard Walker; Christopher L. Bernard

(57)     ABSTRACT

A brake booster pushrod to pedal interface cage includes a plurality of side walls; a front face connecting to each of the plurality of side walls at or near a first side of the plurality of side walls, the front face including a recess for receiving an end of a booster pushrod; and at least one weakened portion configured to allow the booster pushrod to move through the front face at a predetermined force.

13 Claims, 8 Drawing Sheets

(56)     References Cited

U.S. PATENT DOCUMENTS

| 2010/0154581 A1 | 6/2010 | Sukonthapanich |
| 2011/0308349 A1 | 12/2011 | Hjerpe et al. |

FOREIGN PATENT DOCUMENTS

| CN | 116872895 A | * | 10/2023 | ................ B60T 7/06 |
| EP | 1319564 A1 | | 6/2003 | |
| FR | 2841011 B1 | | 4/2008 | |
| FR | 2952151 A1 | * | 5/2011 | .............. G05G 1/46 |
| KR | 102265727 B1 | * | 6/2021 | .............. G05G 1/30 |

* cited by examiner

BRAKE PEDAL WITH SAFETY FEATURES

CROSS-REFERENCE TO RELATED APPLICATION

The present disclosure claims the benefit of priority of co-pending European Patent Application No. 23218668.4, filed on Dec. 20, 2023, the contents of which are incorporated in full by reference.

TECHNICAL FIELD

The present disclosure relates generally to the automotive field, and specifically to a brake pedal for a vehicle.

BACKGROUND

In a vehicle, a pivoting brake pedal that is actuatable by a driver to brake the vehicle is typically coupled to the associated brake booster actuator (whether mechanical or electronic) via a booster pushrod or the like. This brake booster actuator is operable for engaging the brakes of the vehicle with limited brake pedal travel, thereby eliminating a brake pedal that feels "soft" and brakes that exhibit sub-optimal performance.

Typically the pushrod includes a ball structure at either end which is configured to securely engage either a socket joint of the associated pivoting brake pedal arm or a socket joint of the associated brake booster actuator. Such ball structures allow the pushrod to transfer translational motion between the pivoting brake pedal arm and the brake booster actuator, while allowing for a degree of pivoting motion. Generally, the ball structure at the pivoting brake pedal arm is held in the associated socket joint by plastic or metal clips or brackets, such as the prior art brake booster pushrod to pedal interface cage seen in FIGS. 1A-1B. This helps to ensure that the ball structure is held securely in the associated socket joint, but can pivot and, in the case of vehicle maintenance and/or service, be disengaged and replaced along with the pushrod.

SUMMARY

Prior art brake booster pushrod to pedal interface cages, such as those illustrated in FIGS. 1A-1B, provide a good way of ensuring that the ball structure is held securely in the associated socket joint, and can pivot with the movement of the break pedal arm. However, in the case of a vehicle crash or other high force, the driver typically puts a lot of force on the pedal. In addition, crash events can result in the front of the vehicle being compacted (e.g., pushed closer to the driver or the driver being brought closer to the front of the vehicle), resulting in a lot of forces on the driver's foot located on the brake foot pad. The devices and methods herein described attempt to alleviate at least some of this pressure by allowing the pushrod to push through the brake booster pushrod to pedal interface cage, thereby allowing the pedal arm and foot pad to move further forward when subject to forces which would indicate a crash. Thus, the pedal arm and pad can have more forward movement, lessening the pressure on a driver's foot and leg as they can move forward with the pedal arm and pad even when there is relative movement between the front of the vehicle and the location of the driver. This can help to reduce or prevent injuries related to such a situation, particularly in the driver's foot, ankle and/or leg.

According to an aspect, a brake booster pushrod to pedal interface cage includes a plurality of side walls; a front face connecting to each of the plurality of side walls at or near a first side of the plurality of side walls, the front face including a recess for receiving an end of a booster pushrod; and at least one weakened portion configured to allow the booster pushrod to move through the front face at a predetermined force. Such a brake booster pushrod to pedal interface cage, with at least one weakened portion allowing the booster pushrod to move through the front face (e.g., through the recess) at a predetermined force allows for further movements of a pedal arm and foot pad of a brake pedal in the event of a large force. This can help to reduce or prevent injuries to a driver, particularly to the foot or leg as the allowing of more forward movement of the pedal arm and foot pad reduce the forces on the driver's foot in the event of a crash. This is particularly useful when there is compaction of the front of the vehicle pushing the brake pedal arm and foot pad closer to the driver.

According to an embodiment, the at least one weakened portion includes one or more slits in the front face and/or the recess. Such slits could be, for example, slits extending diagonally across the front face and recess to form an X or cross-shape; one or more lines or series of slits extending across the top, bottom and/or sides of the front face or any other configuration which allows for a booster pushrod to push through the front face under specific force levels. Additionally, such slits can allow for a simple way of altering a prior art brake booster pushrod to pedal interface cage for use in the methods and/or assemblies described herein.

According to an embodiment, the cage is formed of steel and/or aluminium. This can be through cutting and bending a sheet of metal, through forging, casting or any other suitable method to form a strong and reliable brake booster pushrod to pedal interface cage which can allow for a pushrod to move through it at predetermined (e.g., high) forces.

According to an embodiment, the recess is an at least part-spherical recess in the front face extending away from the side walls. Such a recess can be configured to receive a spherical end of the pushrod (sometimes with a bearing) and allow for pivoting movement with the pivoting movement of brake pedal arm when the brake is activated or released.

According to further aspect, a brake pedal booster pushrod to pedal interface assembly includes a pivotable brake pedal arm including a foot pad disposed at a distal end of the arm, the brake booster pushrod to pedal interface cage as previously described; a brake clip connecting to the brake booster pushrod to pedal interface cage; and an elongate booster pushrod including a first end adapted to pivotably engage the recess of the brake booster pushrod to pedal interface cage. The brake clip can be plastic or any other suitable material and connects to the brake booster pushrod to pedal interface cage to pivotably hold the first end of the pushrod in the recess of the brake booster pushrod to pedal interface cage. Such an assembly provides an effective brake pedal booster pushrod to pedal interface for normal vehicle operations and braking while allowing for movement of the pushrod through the brake booster pushrod to pedal interface cage into the interior of the pedal arm when subject to a predetermined force level indicating a crash event. Allowing the pushrod to move through the brake booster pushrod to pedal interface cage into the arm allows the pedal arm and foot pad to move further forward reducing forces on a driver's foot and leg in the case of forces indicating a crash in the vehicle. Such reduction in forces can help to reduce or prevent injuries to a driver.

According to an embodiment, the pivotable brake pedal arm and the brake booster pushrod to pedal interface cage are integrally formed. This can be through casting or any other suitable method, and can ensure that the parts stay in place relative to each other for proper control of booster pushrod and braking system.

According to an embodiment, the at least one weakened portion is in an interface or connection between the pivotable brake pedal arm and the brake booster pushrod to pedal interface cage. In some embodiments, this includes a bracket that fits around the booster pushrod to pedal interface cage to secure the cage to the pedal arm. Connection points between the booster pushrod to pedal interface cage and the bracket and/or connection points between the booster pushrod to pedal interface cage and the pedal arm could be the weakened points at the interfaces. Such weakening could be, for example, through weakened welds or thinner material or other weakened connection means. Such a configuration provides a booster pushrod to pedal interface cage that does not itself need to be adapted (e.g., with slits in the front face) but instead allows for pushing through at a predetermined force in weakened interface or connection points. This can allow for easily adapting past booster pushrod to pedal interface cages for use in the assemblies herein discussed.

According to an embodiment, the brake pedal arm is hollow and the at least one weakened portion allows the brake booster pushrod to enter an inside of the hollow pedal arm. Optionally, the assembly includes one or more stops connected to the pivotable brake pedal arm and configured to receive the booster pushrod and stop further forward and/or sliding movement of the booster pushrod with respect to the brake pedal arm after the booster pushrod has moved through the front face of the brake booster pushrod to pedal interface cage. Allowing the pushrod to move through the hollow pedal arm allows for more forward movement of the pedal arm and foot pad when subjected to forces indicating a crash event, thereby reducing the likelihood and/or severity of foot and/or leg injuries to the driver. The one or more stops can be, for example, projections on an inside of the pedal arm configured to catch and secure the end of pushrod after it has pushed through the brake booster pushrod to pedal interface cage. Such stops can control and stop the further forward and/or sliding movement of pushrod inside pedal arm, and can additionally allow for the driver to further brake if needed by allowing for the inside of the pedal arm to push the brake pushrod to actuate the brake booster actuator.

According to an embodiment, the brake pedal arm includes an opening positioned on a front side of the pedal arm to allow the booster pushrod to move through the opening after the booster pushrod has moved through the front face of the front face of the brake booster pushrod to pedal interface cage. Such an opening can allow for even more forward movement of pedal arm and therefore foot pad in the event of a crash or other event causing excessive forces. This can even further reduce the chance of and/or severity of injury to the driver. Such an opening is particularly useful in compact vehicle configurations and/or assemblies in which the pedal arm has a relatively narrow width between a front side and back side where the brake booster pushrod to pedal interface cage is connected. In such a compact vehicle and/or assembly with a narrow pedal arm width, the pedal arm would not allow for much more travel of the pushrod and therefore pedal arm and foot pad if caught by stops inside the pedal arm. By allowing the pushrod to travel through the opening, the pedal arm can move further, thereby reducing forces which could injure the driver.

According to an embodiment, the predetermined force is related to a maximum force on the foot pad. Optionally, the predetermined force is related to a maximum force of 2500-3000 N on the foot pad. Generally, the maximum force a driver could apply to the foot pad outside of a crash event is about 2500-3000 N. Thus, applying forces higher than this to the foot pad can indicate there has been a crash event. The predetermined force is the force at which the pushrod is able to move through the brake booster pushrod to pedal interface cage. Because assemblies have different configurations (e.g., different pedal arm length and widths), the predetermined force level which relates to this level of 2500-3000 N force on the foot pad will be different for each configuration. For example, in an assembly which has a pedal ratio of 4:1, meaning the foot pad is located four times further away from the pivot point of the arm than the brake booster pushrod to pedal interface cage, the predetermined force to allow the booster pushrod to move through the front face could be calculated as:

$$\text{Pedal Ratio} = L/X = 299.3/73 = 4.1,$$

Force of 2500 N on foot pad,

Force in pushrod area =

$$\text{Force on foot pad} * \text{ratio} = 2500 \text{ N} \times 4.1 = 10250 \text{ N},$$

where L is the distance between the pivot point and foot pad and X is the distance between the pivot point and the brake booster pushrod to pedal interface cage (in the above example L=299.3 mm and X=73 mm). Thus, the pedal arm dimensions and configuration could be used to calculate the predetermined force to allow the booster pushrod to move through the front face related to the typical maximum level of force expected from a driver outside a crash event.

According to a further aspect, a vehicle includes the assembly and/or the brake booster pushrod to pedal interface cage previously described. Such a vehicle can help to reduce or eliminate the occurrence of injury to the driver, and particularly to the driver's foot and/or leg during a crash event.

According to a further aspect, a method of forming a brake pedal booster pushrod to pedal interface assembly includes forming or obtaining a brake booster pushrod to pedal interface cage including plurality of side walls and a front face connecting to each of the plurality of side walls, the front face including a recess for receiving an end of a booster pushrod and at least one weakened portion configured to allow the booster pushrod to move through the front face at a predetermined force; connecting the brake booster pushrod to pedal interface cage to a pivotable brake pedal arm; and connecting an end of a booster pushrod to pivotably engage the recess of the brake booster pushrod to pedal interface cage. Such a method can result in an assembly which provides safety features to avoid or reduce injuries in the event of a crash.

The person skilled in the art will understand that the features described above may be combined in any way deemed useful. Moreover, modifications and variations described in respect of the system may likewise be applied to a method.

DETAILED DESCRIPTION

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present disclosure, and similarly, a second element may be referred to as a first element.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "vehicle" as used herein refers to a thing used for transporting people or goods. Automobiles, cars, trucks, or buses etc. are examples of vehicles. The vehicle could be an "electric vehicle (EV)", powered by an electric motor that draws current from an on-vehicle energy storage device, such as a battery, which is rechargeable from an off-vehicle source, such as residential or public electric service or an on-vehicle fuel powered generator. The vehicle may be two or more wheeled vehicles manufactured for use primarily on public streets, roads.

Figure 1A:
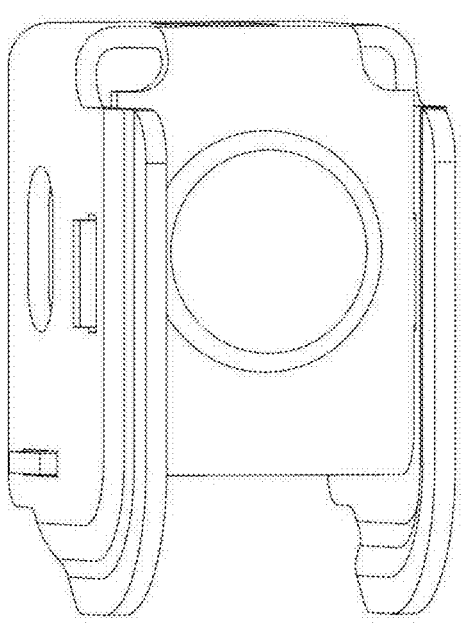
FIG. 1A illustrates a front perspective view of a prior art brake booster pushrod to pedal interface cage.
Figure 1B:
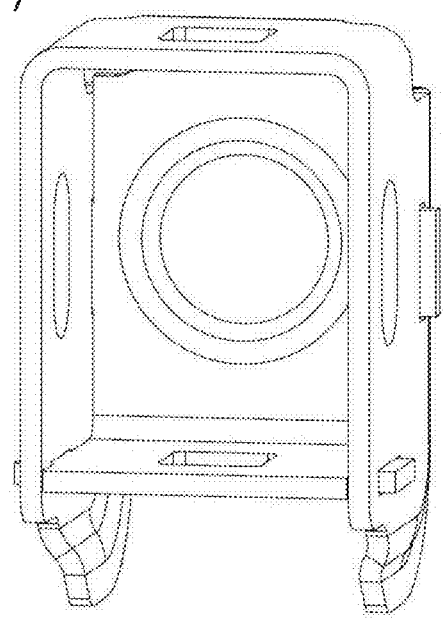
FIG. 1B illustrates a back perspective view of the prior art brake booster pushrod to pedal interface cage of FIG. 1A.
Figure 2A:
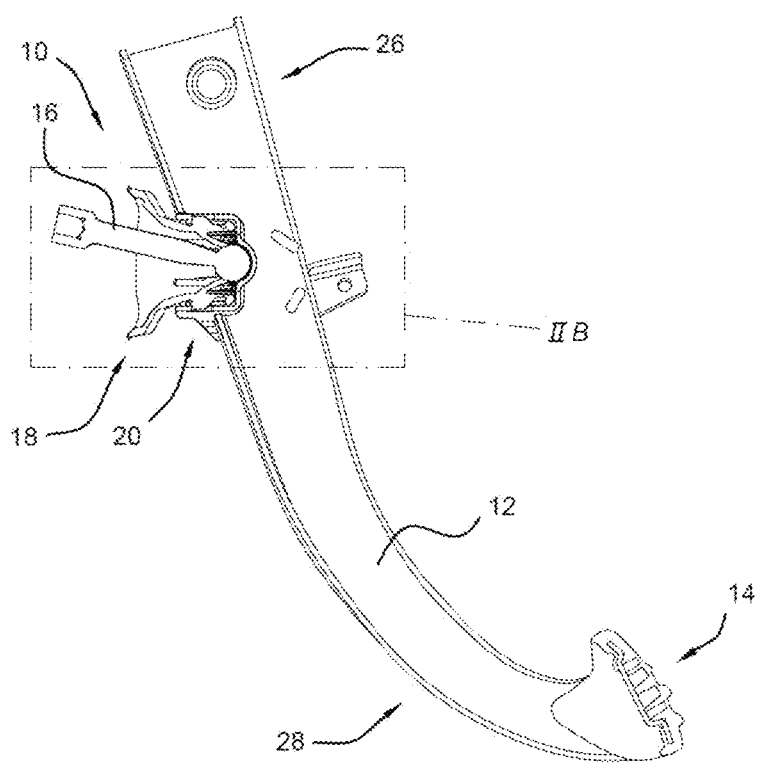
FIG. 2A illustrates a cross-sectional view of a brake pedal booster pushrod to pedal interface assembly connected to a pedal arm with foot pad.
Figure 2B:
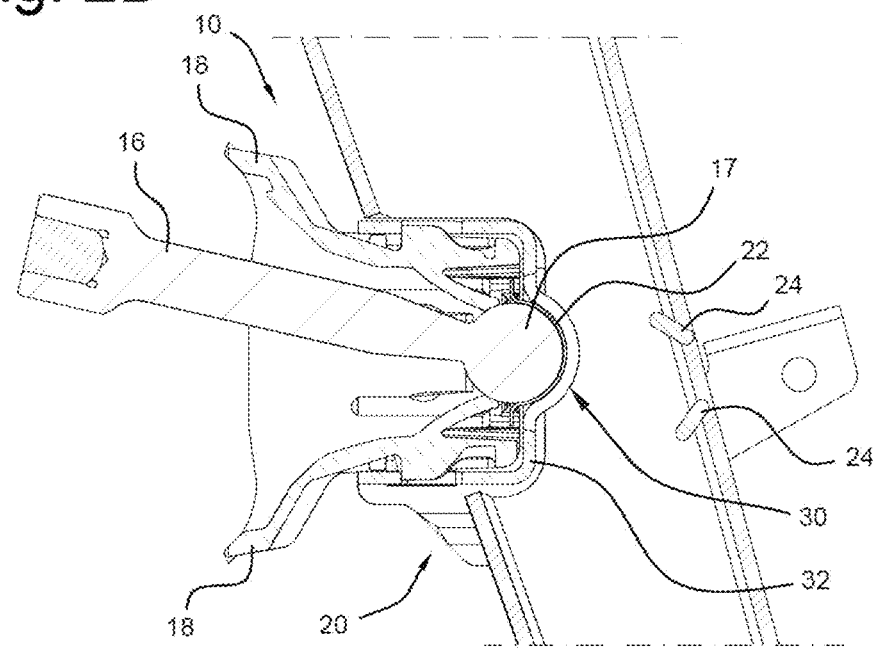
FIG. 2B illustrates a close-up view of the cross-section of the brake pedal booster pushrod to pedal interface assembly and connection to a pedal arm.

FIG. 2A illustrates a cross-sectional view of a brake pedal booster pushrod to pedal interface assembly 10 connected to pedal arm 12 with foot pad 14; FIG. 2B illustrates a close-up view of section B of FIG. 2A. Assembly 10 includes pushrod 16, clips 18, brake booster pushrod to pedal interface cage 20; ball bearing 22 and stops 24.

Pedal arm 12 extends from a first end 26, around which it is pivotable, to a second end 28, to which foot pad 14 connects. Brake pedal booster pushrod to pedal interface assembly 10 connects between first end 24 and second end 28, and can vary which exact point of pedal arm 14 it is connected to depending on the specific configuration of the vehicle in which it is located. In some embodiments, brake booster pushrod to pedal interface cage 20 and pedal arm 14 are formed integrally and are not separate parts with are connected (e.g., welded) together. Pedal arm 14 is hollow and includes front wall 13 and back wall 15, with its width typically varying along the length of pedal arm 14.

Pushrod 16 extends from a connection to the brake booster actuator (not shown) to end 17 which connects to brake booster pushrod to pedal interface cage 20, and specifically the part-spherical shaped recess 30 in front face 32 of brake booster pushrod to pedal interface cage 20. Plastic clips 18 connect around pushrod 16 and to brake booster pushrod to pedal interface cage 20 to secure end 17 of pushrod 16 with respect to brake booster pushrod to pedal interface cage 20. Ball bearing 22 connects around end 17 of pushrod 16 and works to reduce friction and noise in the pivoting and movement of pushrod 16 with respect to brake booster pushrod to pedal interface cage 20 when pushed or pulled by pedal arm 12 movement. Bearing 22 can be, for example, a thin sheet of metal.

In operation, a driver pushes on foot pad 14 with his foot, which causes pedal arm 12 to pivot around first end 26 and thereby move pushrod 16 to actuate the brake booster (not shown). Pushrod 16 and brake arm 14 are then moved back into their original positions (e.g., through a spring, see FIG. 3B) when force is removed from the foot pad 14 by the driver.

Figure 2C:
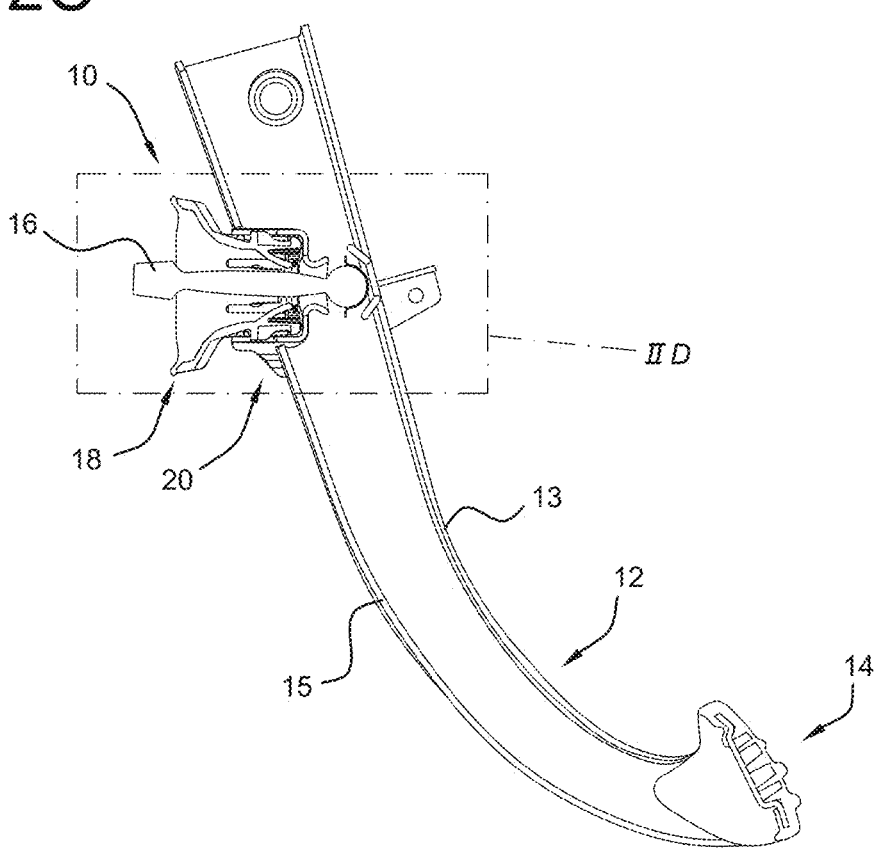
FIG. 2C illustrates a view of the assembly of FIG. 2A after a crash event.
Figure 2D:
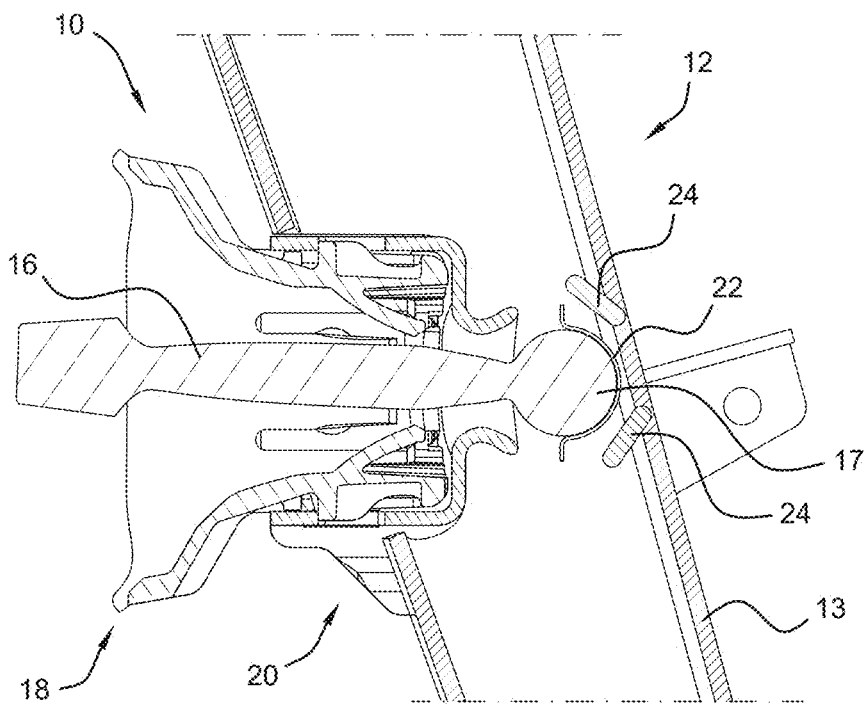
FIG. 2D illustrates a close-up view of part of FIG. 2C.

As mentioned above, when a crash occurs, this typically results in a large amount of force being put on brake pad 14 by the driver, and therefore a lot of force being put on the driver's foot and/or limb when the brake pad 14 is pushed as far as it can go (limited by pushrod 16). This is particularly prevalent if the front portion of the vehicle is moved toward the driver in the crash (e.g., the front end of the vehicle experiences compaction in the crash). To reduce or prevent injuries to the driver in such a situation, assembly 10 allows for pushrod 16 to move through the brake booster pushrod to pedal interface cage 20 and into the hollow pedal arm 14 at a certain force threshold, as shown in FIGS. 2C-2D. Thus, pushrod 16 (with bearing 22) moves through brake booster pushrod to pedal interface cage 20 and is stopped by stops 24 at an inside of front wall 13 of pedal arm 12 in such a situation. As can be seen in FIG. 2C, this allows for more forward movement of foot pad 14, thereby alleviating some forces on the driver's foot and leg and reducing or preventing associated injuries. Additionally, stops 24 inside of pedal arm 14 catch end 17 of pushrod 16 to prevent further forward and/or sliding movement and therefore allow for further braking of the vehicle by now using pedal arm 12 front wall 13 with stops 24 to move pushrod 16 to actuate the brake booster. Stops 24 are shown schematically for example purposes only, and could take other configurations provided they are positioned and arranged to stop and guide end 17 of pushrod 16 when it moves through brake booster pushrod to pedal interface cage 20 and/or additional braking is needed after movement through front face 32.

Thus, assembly 10 allows for reduced forces on a driver's foot and leg in the event of a crash as assembly 10 is configured to allow pushrod 16 to push through front face 32 of brake booster pushrod to pedal interface cage 20, thereby allowing pedal arm 12 and foot pad 14 to move further forward and therefore reduce the chances of injury to a driver in such a situation. The amount of movement allowed through such an assembly 10 would depend on the dimensions (e.g., length and width) of pedal arm 12, placement of assembly 10 with respect to the pivot point of pedal arm, etc. In some embodiments, the extra movement in such an assembly 10 could be about 20 mm during a crash, thereby reducing the load on the driver's foot from the allowing of such movement.

Forces which would allow pushrod 16 to move through brake booster pushrod to pedal interface cage 20 would be related to expected normal forces a driver could or would put on the foot pad 14 outside of a crash event. Typically such forces would be up to about 2500 N-3000 N, though could vary. Thus, the forces needed to allow movement of pushrod 16 though brake booster pushrod to pedal interface cage 20 would be the forces experienced at brake booster pushrod to pedal interface cage 20 when more than 2500-3000 N of force were applied to foot pad 14.

Figure 3A:
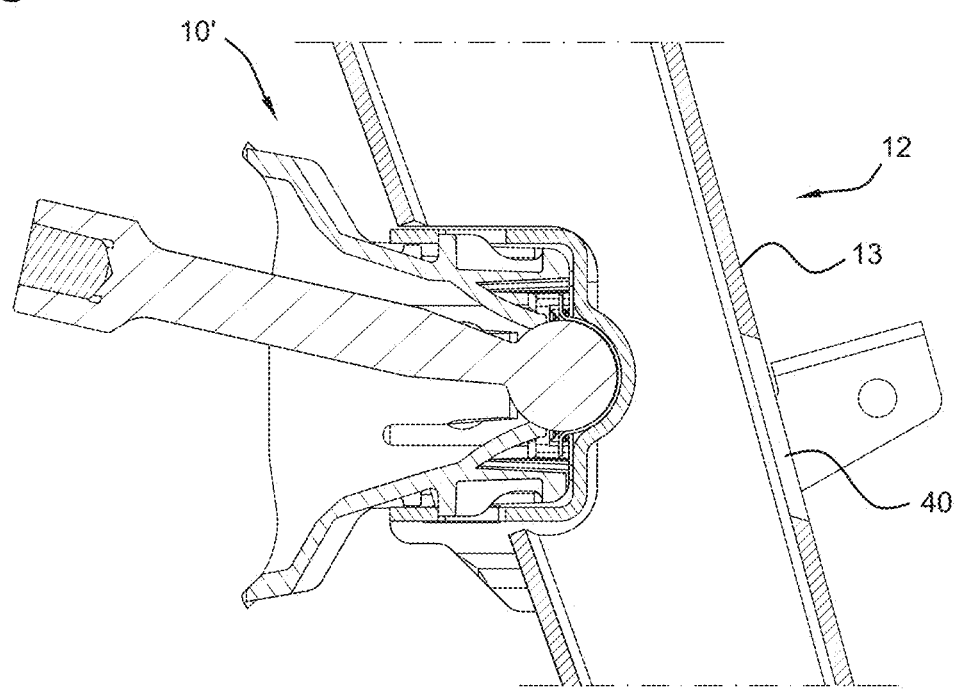
FIG. 3A illustrates a cross-sectional view of a second embodiment of a brake pedal booster pushrod to pedal interface assembly connected to a pedal arm with foot pad.
Figure 3B:
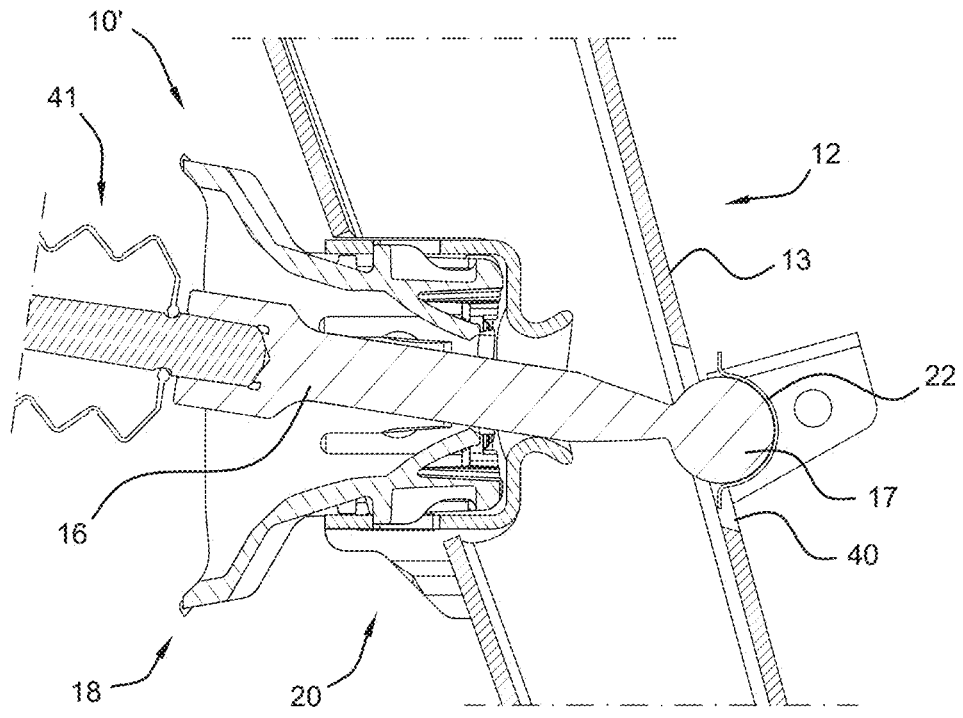
FIG. 3B illustrates a cross-sectional view of the assembly of FIG. 3A after a crash event.

FIG. 3A illustrates a cross-sectional view of a second embodiment of a brake pedal booster pushrod to pedal interface assembly 10' connected to a pedal arm 12' with foot pad 14; and FIG. 3B illustrates a cross-sectional view of assembly 10' after a crash event. Similar parts will be labeled similarly to those shown in FIGS. 2A-2D, and generally only differences will be discussed.

Assembly 10' includes pushrod 16 (with end 17), clips 18, brake booster pushrod to pedal interface cage 20; and bearing 22. Instead of the stops shown in the embodiment of FIGS. 2A-2D, assembly 10' includes an opening 40 in front wall 13 of pedal arm 12. Opening 40 is positioned at the point in pedal arm 12 where pushrod 16 would naturally extend and come into contact with when pushrod 16 moves through brake booster pushrod to pedal interface cage 20. Opening 40 is also sized according to the size of pushrod 16 end 17 and bearing 22.

When foot pad 14 is subjected to a force which allows pushrod 16 to move through brake booster pushrod to pedal interface cage 20, as shown in FIG. 3B, pushrod 16 is then able to also move through opening 40 in front wall 13 of pedal arm 12. Such a configuration allows for even more movement of pedal arm 12 and thus foot pad 14 in a forward direction during a crash event, thereby allowing for a reduction of forces on a driver's foot and/or leg which could cause damage or injury.

FIGS. 4A-6B illustrate example embodiments of configurations of brake booster pushrod to pedal interface cages which allow for the movement of pushrod 16 through the cage when subjected to specific force levels (e.g., force levels relating to above 2500 N-3000 N on foot pad 14).

Figure 4A:
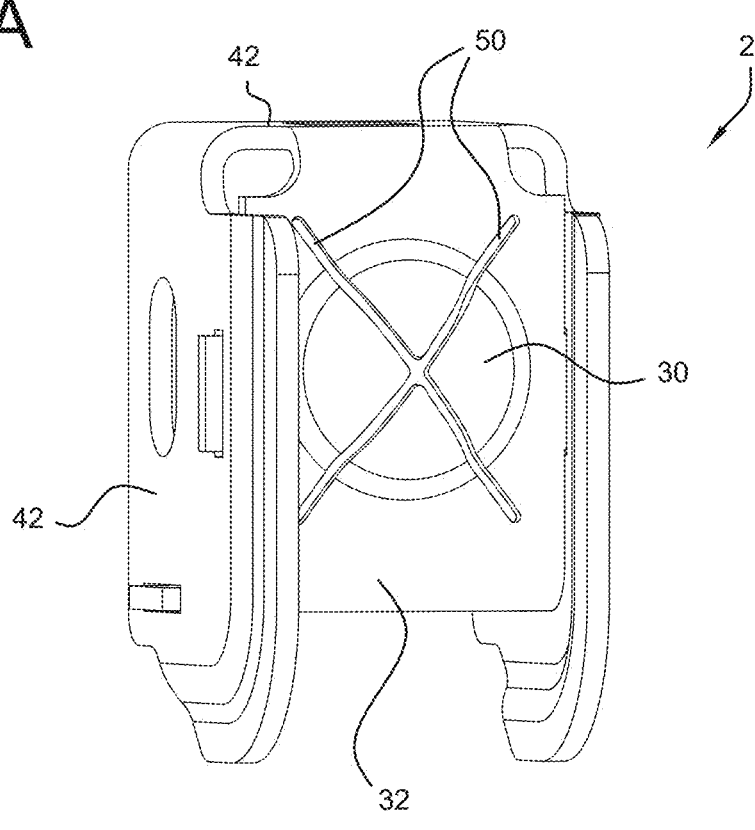
FIGS. 4A and 4B illustrate perspective front and back views of a first embodiment of a brake booster pushrod to pedal interface cage.
Figure 4B:
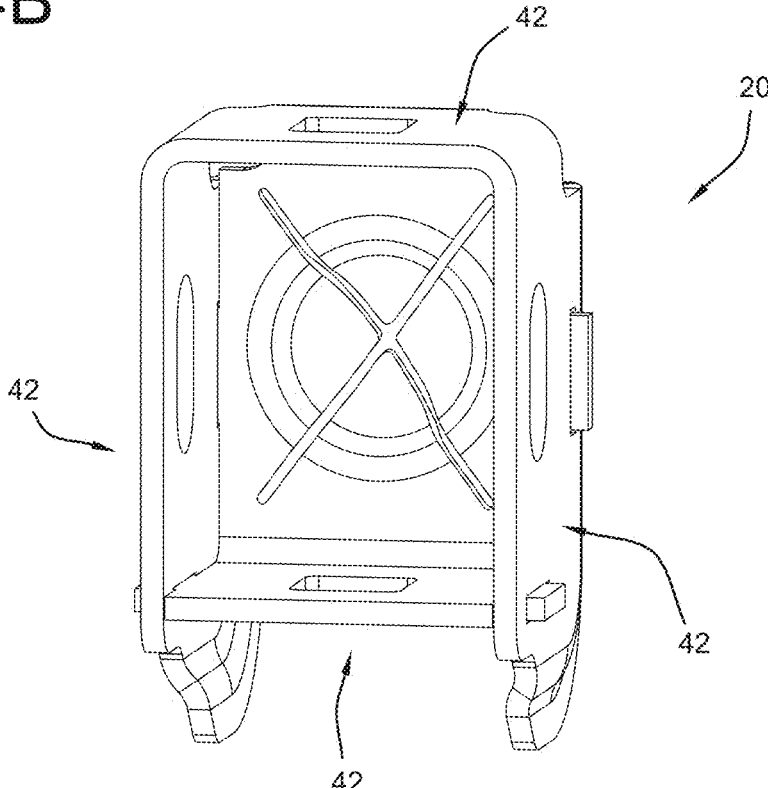

FIGS. 4A-4B illustrate perspective front and back views of a first embodiment of a brake booster pushrod to pedal interface cage 20, which includes side walls 42 and front face 32 connecting at (or near) a first side of side walls 42. Front face 32 includes recess 30, which is configured to receive end 17 of pushrod 16, and in this case is thus part-spherically shaped to receive spherical end 17 of pushrod 16.

Brake booster pushrod to pedal interface cage 20 is typically formed of metal, for example, steel or aluminium, and could be either cut and bent into the shape shown in FIGS. 4A-6B, or could be casted or formed in any other suitable method. Side walls 42 form a housing into which clips 18 extend and secure pushrod 16 with respect to brake booster pushrod to pedal interface cage 20, and particularly end 17 with respect to recess 30. Such a configuration is able to hold end 17 in recess 30, also allowing for pivoting movement as pedal arm 12 pushes pushrod 16 in one direction and brake booster pushrod 16 is pushed back in the other direction, for example, by spring 41 (shown in FIG. 3B).

In this embodiment, brake booster pushrod to pedal interface cage 20 includes two slits 50 forming an X-shape in the front face 32 and recess 30. Such slits could be, for example, machined into the front face 32 and recess 30 or formed by any other means. Such slits 50 are configured to allow pushrod 16 end 17 to push through front face 32 of brake booster pushrod to pedal interface cage 20 when subjected to large crash-event forces, as described in relation to FIGS. 2A-3B. Such a configuration, with opening 40 allowing for even more movement of pedal arm 12 and foot pad 14 with respect to the end 17 of pushrod 16 can be especially useful in vehicles with a compact configuration and/or configurations in which pedal arm 14 has a smaller width and there would not be much additional movement between the normal positioning of pushrod 16 end 17 in brake booster pushrod to pedal interface cage 20 and the stopping of end 17 with stops inside arm 14 (like those shown in FIGS. 2A-2D). Thus, letting pushrod 16 extend outside pedal arm 12 through opening 40 can provide for reduced forces during a crash event on the driver, even in vehicles with a compact size and/or smaller width of pedal arm 14.

Figures 5A, 5B:
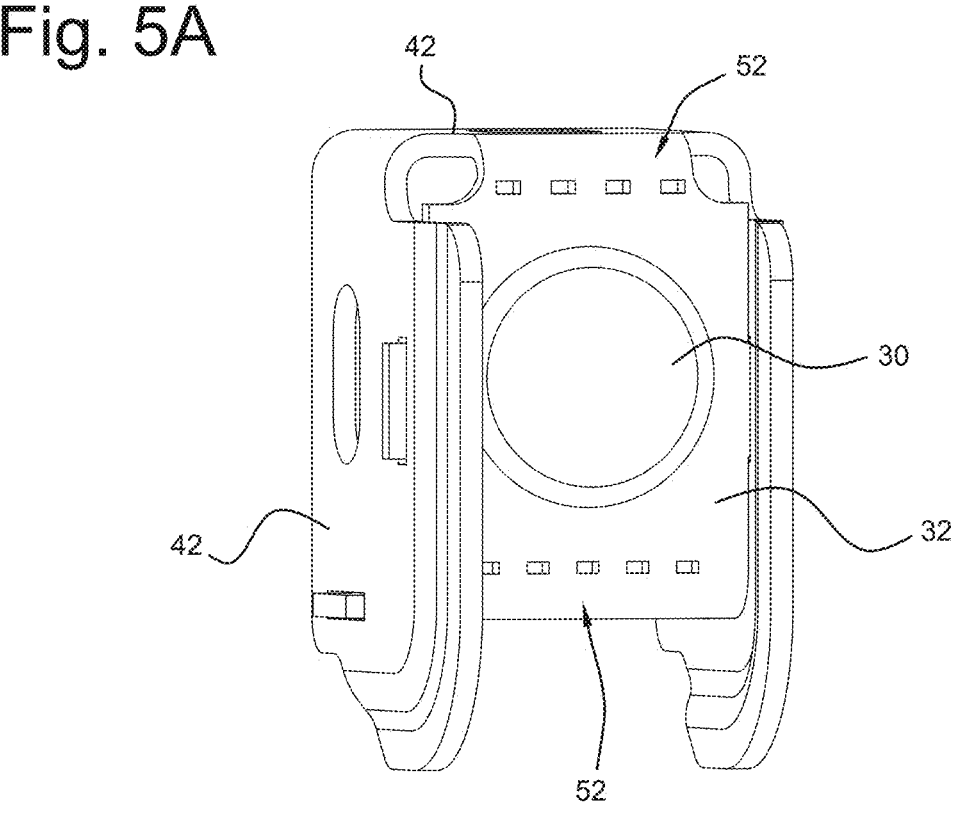
FIGS. 5A and 5B illustrate perspective front and back views of a second embodiment of a brake booster pushrod to pedal interface cage.

FIGS. 5A-5B illustrate perspective front and back views of a second embodiment of a brake booster pushrod to pedal interface cage 20. In this embodiment, front face 32 includes two lines of slits in series extending across a top side and bottom side of front face 32. Lines 52 of slits provide weakened portions of brake booster pushrod to pedal interface cage 20 which allow pushrod 16 to move through brake booster pushrod to pedal interface cage 20 front face 32 in the event of a crash causing sufficient forces.

Such series 52 of slits are shown for example purposes, and could be formed of more or fewer slits, more or fewer lines, slits of different sizes, on sides of front face 32 instead of top and bottom, etc.

Figure 6A:
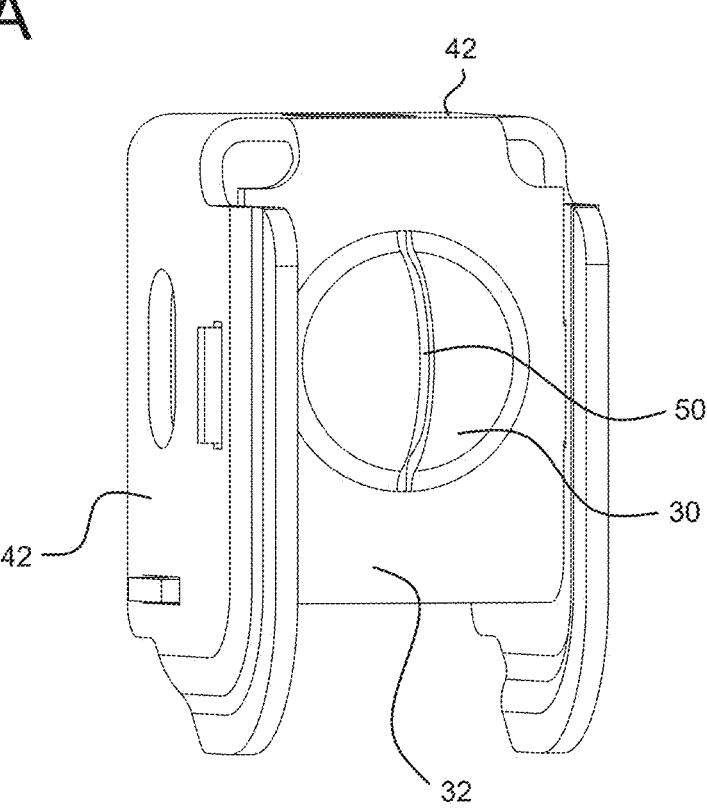
FIGS. 6A and 6B illustrate perspective front and back views of a third embodiment of a brake booster pushrod to pedal interface cage.
Figure 6B:
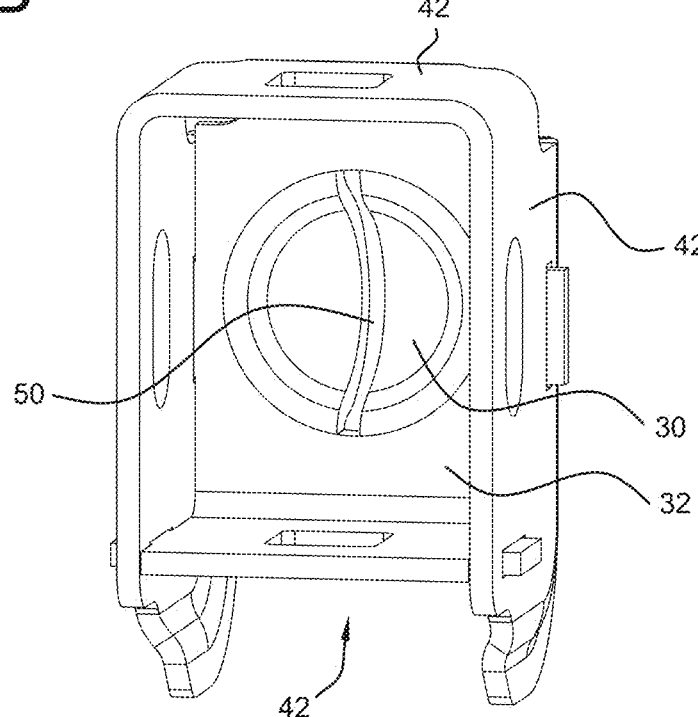

FIGS. 6A-6B illustrate perspective front and back views of a third embodiment of a brake booster pushrod to pedal interface cage 20. In this embodiment, recess 30 of front face 32 includes one slit 50 extending through the center of recess 30.

Figure 7:
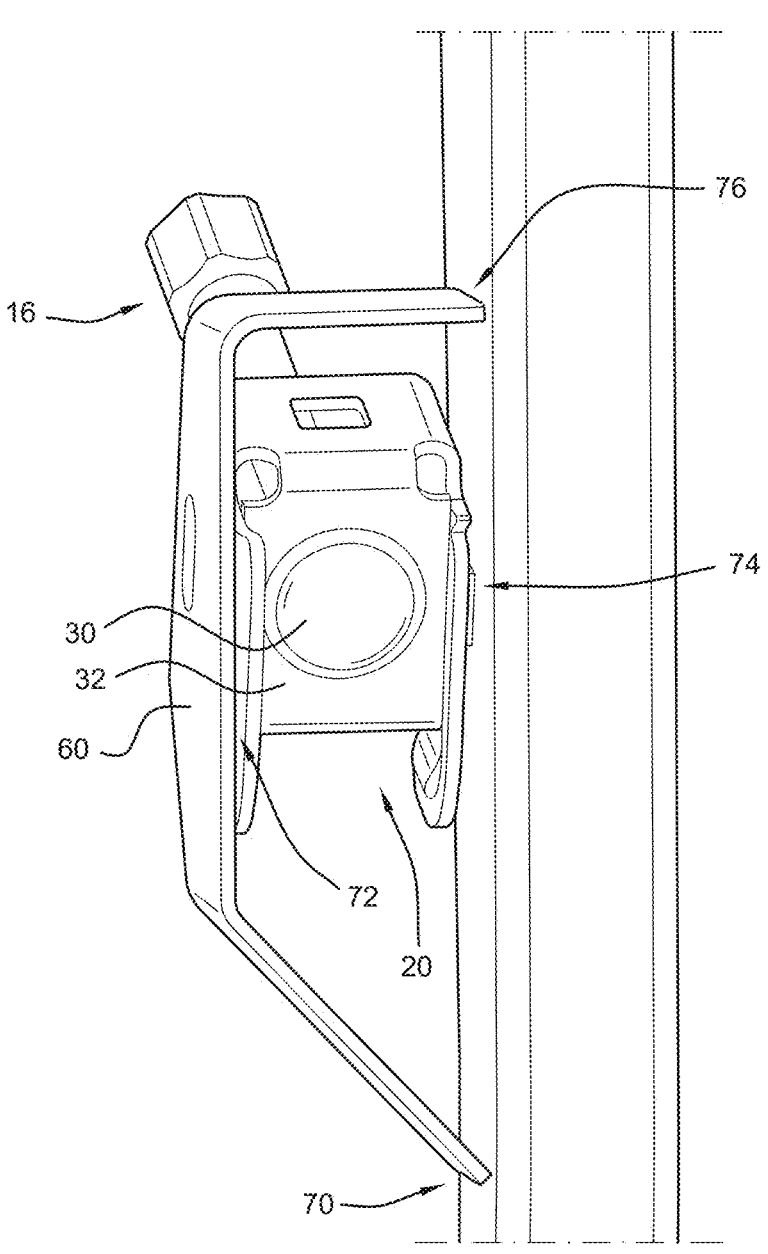
FIG. 7 illustrates a perspective view of an embodiment of an assembly of a brake pedal arm and a booster pushrod to pedal interface cage with weakened portions in the interface between the booster pushrod to pedal interface cage and the arm.

FIG. 7 illustrates a perspective view of an embodiment of an assembly of a brake pedal arm 12 and a booster pushrod to pedal interface cage 20 with weakened portions in the interface between the booster pushrod to pedal interface cage 20 and the arm 14. In this embodiment, booster pushrod to pedal interface cage 20 can be at least partially held in connection with arm 12 through bracket 60, for example through welding. One or more of connection points 70, 72, 74 and 76 could be weakened to allow for pushrod 16 to push through front face 32 at a predetermined force. For example, areas 72 and 74 could be weakened allowing for disconnection between booster pushrod to pedal interface cage 20 and arm 12 and bracket 60, respectively; and/or areas 76 and 70 could be weakened allowing for disconnection between bracket 60 and arm 12. Such weakened connection could be, for example, through a weak weld or thinner connection material, or any other means allowing for deformation upon a specific predetermined force.

Thus, each of the brake booster pushrod to pedal interface cages 20 shown in FIGS. 4A-7 show different embodiments of brake booster pushrod to pedal interface cages and/or assemblies with a weakened portion configured to allow booster pushrod 16 to move through recess 30 at a predetermined force (e.g., a force indicating a crash event). This can allow for lessening of forces on the driver's foot and leg, thereby reducing or preventing any associated injuries as discussed in relation to FIGS. 2A-3B. While these specific embodiments are shown as examples, brake booster pushrod to pedal interface cage 20 could have other configurations which allow for pushing through the front face 32 by the pushrod 16, for example, weakened connections of the front face 32 and the side walls 42 or other configurations which keep a sturdy brake booster pushrod to pedal interface cage 20 for securing the pushrod 16 during normal driving conditions, but allowing for the movement of pushrod 16 through front face 32 under crash forces.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims.

The invention claimed is:

1. A brake booster pushrod to pedal interface cage comprising:
a plurality of side walls;
a front face connecting to each of the plurality of side walls at a first side of the plurality of side walls, the front face comprising a recess for receiving an end of a booster pushrod; and
at least one weakened portion configured to allow the booster pushrod to move through the front face at a predetermined force, wherein the at least one weakened portion comprises one or more slits in the front face and/or the recess.

2. The brake booster pushrod to pedal interface cage of claim 1, wherein the at least one weakened portion comprises at least one series of slits extending across the front face.

3. The brake booster pushrod to pedal interface cage of claim 1, wherein the at least one weakened portion comprises slits extending diagonally across the front face and/or the recess to form an X.

4. The brake booster pushrod to pedal interface cage of claim 1, wherein the cage is formed of steel or aluminium.

5. The brake booster pushrod to pedal interface cage of claim 1, wherein the recess is a spherical recess in the front face extending away from the side walls.

6. A brake pedal booster pushrod to pedal interface assembly comprising:
a pivotable brake pedal arm comprising a foot pad disposed at a distal end of the pedal arm, and a brake booster pushrod to pedal interface cage comprising:
a plurality of side walls;
a front face connecting to each of the plurality of side walls at a first side of the plurality of side walls, the front face comprising a recess for receiving an end of an elongate booster pushrod; and
at least one weakened portion configured to allow the booster pushrod to move through the front face at a predetermined force;
a brake clip connecting to the brake booster pushrod to pedal interface cage;
wherein the booster pushrod comprises a first end adapted to pivotably engage the recess of the brake booster pushrod to pedal interface cage; and
one or more stops connected to the pedal arm and configured to receive the booster pushrod and stop further forward and/or sliding movement of the booster pushrod with respect to the pedal arm after the booster pushrod has moved through the front face of the brake booster pushrod to pedal interface cage.

7. The brake pedal booster pushrod to pedal interface assembly of claim 6, wherein the pivotable brake pedal arm and the brake booster pushrod to pedal interface cage are integrally formed.

8. The brake pedal booster pushrod to pedal interface assembly of claim 6, wherein the at least one weakened portion is in an interface or connection between the pivotable brake pedal arm and the brake booster pushrod to pedal interface cage.

9. The brake pedal booster pushrod to pedal interface assembly of claim 6, wherein the pedal arm is hollow and the at least one weakened portion allows the brake booster pushrod to enter an inside of the pedal arm.

10. The brake pedal booster pushrod to pedal interface assembly of claim 6, wherein the pedal arm comprises an opening positioned to allow the booster pushrod to move through the opening after the booster pushrod has moved through the front face of the brake booster pushrod to pedal interface cage.

11. The brake pedal booster pushrod to pedal interface assembly of claim 6, wherein the predetermined force is calculated based on a maximum force on the foot pad and a pedal ratio of the pedal arm.

12. A vehicle comprising the brake pedal booster pushrod to pedal interface assembly of claim 7 and/or the brake booster pushrod to pedal interface cage of claim 1.

13. A method of forming a brake pedal booster pushrod to pedal interface assembly, the method comprising:
forming or obtaining a brake booster pushrod to pedal interface cage comprising a plurality of side walls and a front face connecting to each of the plurality of side walls, the front face comprising a recess for receiving an end of a booster pushrod and at least one weakened portion configured to allow the booster pushrod to move through the front face at a predetermined force, 5 wherein the at least one weakened portion comprises one or more slits in the front face and/or the recess;

connecting the brake booster pushrod to pedal interface cage to a pivotable brake pedal arm; and connecting the end of the booster pushrod to pivotably 10 engage the recess of the brake booster pushrod to pedal interface cage.

* * * * *